United States Patent
Mueller et al.

(10) Patent No.: US 8,205,858 B2
(45) Date of Patent: Jun. 26, 2012

(54) ELECTROMAGNETIC PRESSURE VALVE

(75) Inventors: Erwin Mueller, Renningen (DE); Klaus Schudt, Nordheim (DE); Michael Duerr, Gechingen (DE); Rene Deponte, Weil im Schoenbuch (DE); Guido Daimer, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 799 days.

(21) Appl. No.: 12/240,158

(22) Filed: Sep. 29, 2008

(65) Prior Publication Data

US 2009/0090881 A1    Apr. 9, 2009

(30) Foreign Application Priority Data

Oct. 4, 2007   (DE) .................... 10 2007 047 422

(51) Int. Cl.
*F16K 31/02*   (2006.01)

(52) U.S. Cl. .................. 251/129.18; 251/337; 267/174; 303/119.2

(58) Field of Classification Search ............. 251/129.14, 251/129.15, 129.18, 129.19, 337; 267/166–180; 303/119.2

See application file for complete search history.

(56) References Cited

U.S. PATENT DOCUMENTS

| | | | | | |
|---|---|---|---|---|---|
| 2,764,996 | A | * | 10/1956 | Brown | 92/95 |
| 2,833,508 | A | * | 5/1958 | Bydalek et al. | 251/129.11 |
| 2,954,793 | A | * | 10/1960 | Seeler | 137/512.2 |
| 4,111,407 | A | * | 9/1978 | Stager | 267/166.1 |
| 4,947,893 | A | * | 8/1990 | Miller et al. | 137/625.65 |
| 5,075,584 | A | * | 12/1991 | Hendrixon et al. | 310/14 |
| 5,180,149 | A | * | 1/1993 | Given et al. | 267/280 |
| 5,301,921 | A | * | 4/1994 | Kumar | 251/129.08 |
| 5,464,178 | A | * | 11/1995 | Grinwald et al. | 248/50 |
| 5,636,828 | A | | 6/1997 | Brehm et al. | |
| 5,921,475 | A | * | 7/1999 | DeVriese et al. | 239/585.4 |
| 6,065,495 | A | * | 5/2000 | Fong et al. | 137/625.25 |
| 6,269,827 | B1 | * | 8/2001 | Potter | 137/14 |
| 6,305,664 | B1 | * | 10/2001 | Holmes et al. | 251/129.18 |
| 6,328,065 | B1 | | 12/2001 | Schmid et al. | |
| 6,367,769 | B1 | * | 4/2002 | Reiter | 251/129.19 |
| 6,554,027 | B1 | | 4/2003 | Schuurman | |
| 6,899,313 | B2 | * | 5/2005 | Carrillo et al. | 251/129.08 |
| 6,989,729 | B2 | | 1/2006 | Mayr et al. | |
| 7,578,494 | B2 | * | 8/2009 | Mitsumata et al. | 251/129.15 |

FOREIGN PATENT DOCUMENTS

| | | |
|---|---|---|
| DE | 44 31 549 | 3/1996 |
| DE | 197 33 660 | 2/1999 |
| DE | 198 47 304 | 5/2000 |
| DE | 101 34 115 | 1/2003 |
| DE | 102 32 293 | 6/2004 |
| DE | 102 55 414 | 6/2004 |

* cited by examiner

*Primary Examiner* — John Rivell
*Assistant Examiner* — Matthew W Jellett
(74) *Attorney, Agent, or Firm* — Michael J. Striker

(57) ABSTRACT

An electromagnetic pressure regulating valve has a valve portion for conducting and regulating the pressure of an operating medium, such as oil, a magnet portion for actuating the valve portion for regulating the pressure of the operating medium and having a magnet housing, in which a magnet core is located that as needed exerts magnetic force on an armature, located in the magnet housing, a spring with a spring force generating a pressure activation threshold to be overcome upon regulation and located between the armature and an adjusting ball that is located in a pole piece of the magnet housing, and the spring has regions of different diameter.

7 Claims, 2 Drawing Sheets

ELECTROMAGNETIC PRESSURE VALVE

CROSS-REFERENCE TO RELATED APPLICATION

The invention described and claimed hereinbelow is also described in German Patent Applications DE 10 2007 047 422.0 filed on Oct. 4, 2007. This German Patent Applications, whose subject matter is incorporated here by reference, provides the basis for a claim of priority of invention under 35 U.S.C. 119(a)-(d).

BACKGROUND OF THE INVENTION

The invention relates to an electromagnetic pressure valve, having a valve portion for conducting and regulating the pressure of a working medium, such as oil, and having a magnet portion for actuating the valve portion for regulating the pressure of the working medium, in which the magnet portion has a magnet housing with a pole piece, and an adjusting ball is mounted in a hole in the pole piece, and an armature, upon which magnetic force can be exerted as needed, is located in the magnet housing, and a pressure activation threshold to be overcome in the regulation is generated by a spring force of a spring located between the armature and the adjusting ball.

In modern automatic transmissions of motor vehicles that are used preferentially in passenger cars, hydraulically actuated clutches are used to change gears. So that these shifting operations will proceed without bucking and imperceptibly to the driver, it is necessary that the hydraulic pressure be adjusted with maximum pressure precision to predetermined pressure ramps corresponding to the clutches.

For adjusting these pressure ramps, electromagnetically actuated pressure regulating valves are used in the prior art. These pressure regulating valves can be sorted into categories in terms of their construction, namely a seat type or a slide piston type.

One such electromagnetic pressure regulating valve of the seat type is known from German Patent Disclosure DE 19733660 A1.

The use of electromagnetic pressure regulating valves is described for instance in German Patent Disclosure DE 10134115 A1. In it, the hydraulic control is also disclosed in the context of a double clutch transmission.

The pressure level required for actuating the clutches is attained in the prior art by way of a pressure balance integrated with the valve. In this case, a force, which is brought to bear by the electromagnet and is variable as a function of current, is brought into equilibrium with the hydraulic force of the operating medium on the valve seat.

When the principle of a pressure balance is employed, only limited precision of the predefined pressure level is established in actual practice, because of variations in geometry and/or materials. It is therefore necessary to be able to calibrate the value of the pressure at which an equilibrium ensues upon the assembly of the pressure regulating valve. It is therefore standard for so-called adjusting springs to be installed. These adjusting springs must be in contact with an adjusting mechanism, so that the above-described equilibrium of the pressure balance can be shifted to a desired pressure value. This adjustment is effected upon manufacture of the pressure regulating valve, and the valve pressure is measured via a pressure sensor. If the measured actual pressure deviates from the desired set-point pressure, then the initial tension of the compression spring is varied until such time as the desired set-point pressure is established.

Various adjusting mechanisms for the adjusting spring are known from the prior art. Typically, adjusting screws, adjusting bushes, or adjusting caps are used.

From German Patent Disclosure DE 19847304 A1, an electromagnetically actuatable pressure regulating valve is known, in which as an adjusting screw, an adjusting mechanism is shown. From German Patent Disclosure DE 10232293 B4, a further pressure regulating valve is known, in which the spring adjustment, in contrast to DE 19847304 A1, is attained by means of an adjusting bush. The adjusting bush is disclosed there as a slit adjusting bush. An implementation by means of an adjusting cap is disclosed in German Patent Disclosure DE 10255414 A1.

When adjusting screws are used, the initial tension of the adjusting spring is varied in such a way that the adjusting spring, embodied as a compression spring, is braced on the screw, and the spring length is varied by rotating the adjusting screw in accordance with the thread pitch. In pressure regulating valves that are based on the use of adjusting bushes or adjusting caps, however, the spring force is not varied by rotation but rather by an axial displacement of the adjusting components. The adjusting bush or adjusting screw is secured with radial initial tension in a receiving bore, in the manner of a press fit. As a result, the final position, finely calibrated in the final assembly, is maintained when the pressure regulating valve is used.

Since pressure regulating valves in use in automatic transmissions are exposed to severe environmental conditions, securing devices are necessary, to prevent a variation in the pressure to be regulated in operation, or in other words in the range of equilibrium of the pressure balance. In operation of the pressure regulating valve, high oscillatory accelerations occur in particular, which the adjusting mechanism must handle in such a way that no displacement in the spring initial tension results from this oscillatory stress. Thus for this reason, in adjusting screws, a means of securing against relative rotation is employed, using microencapsulated and/or plastic-coated threads. Alternatively or in addition, however, form-locking embodiments are also used. In this case, calked embodiments are an attractive option. In such embodiments, material is positively displaced from an outer part into a screw slot.

While means of securing against relative rotation have proven themselves for adjusting screws, when adjusting bushes or adjusting caps are used only security against displacement with regard to the axial displacement force are necessary. However, then the problem arises that the necessary axial displacement force must not be selected as too high, since otherwise precise adjustment is no longer possible. On the other hand, the force must not be selected as overly low, either, because otherwise unwanted displacement would occur in response to the oscillatory stress. To keep the force within an appropriate range, it is therefore necessary for not only the bushes or cups but also the receiving component to be manufactured with very high precision with regard to the diameter of the cooperating components. From a production standpoint, however, this is very complicated and expensive.

In order to find a solution to this problem, slit adjusting bushes, known for instance from DE 10232293 B4, have been used so far. When such adjusting bushes embodied in slit form are used, markedly less deviation in the adjusting force is found. Because of the slit in the adjusting bush, the interior of the electromagnet that is a part of the pressure regulating valve and is inserted with the outside basically via a bore in which the adjusting bush is located, communicates in unsealed fashion with the environment. As a result, contaminating elements can penetrate into the interior of the pressure regulating valve, and/or an oil filling can be lost from leakage.

To prevent this, a further additional sealing element has so far been installed, such as a sealing ball or plastic cap. This is inconvenient, too, since the assembly takes longer then, and additional parts have to be installed, and since these additional parts have to be kept on hand as well, which in turn leads to an increase in costs.

From the prior art, namely German Patent Disclosure DE 4431459 A1, an electromagnetic pressure regulating valve is also known in which an adjusting ball is located in a bore of a valve cap. The valve cap is located on the side remote from the valve portion of the magnet portion of the pressure valve. Between an armature, into which a tappet is press-fitted, and the adjusting ball, a helical spring is inserted. However, this disclosure has the disadvantage that the helical spring easily buckles, and thus friction occurs between the spring and the valve cap and/or the armature in operation of this pressure regulating valve. That has the attendant disadvantage that the pressure point range of the pressure regulating valve varies, and precise shifting is accordingly no longer possible.

SUMMARY OF THE INVENTION

The invention advantageously makes spring adjustment possible at optimized cost, and the various individual parts used are easy to manufacture; the individual parts used make an adjusting force available that varies only slightly, the interior of the pressure regulating valve is protected against the penetration of dirt, and the pressure regulating valve is protected against an escape of the oil filling.

This is advantageously attained by providing that the spring has regions of different diameter.

The pressure regulating valve of the invention is composed of simple individual parts, which assures an adjusting force variation that deviates only slightly and protects the interior of the pressure regulating valve against invading dirt and the pressure regulating valve against the escape of the oil filling. This is due, among other things, to the fact that the adjusting ball can be manufactured extremely precisely, and thus has very precise diameter variations and surface roughness values, so that a displacement force with only slight deviation can be attained. The interior of the pressure regulating valve, and in particular the inner region of the magnet portion, is sealed off via the press-fitted wall. No additional sealing element is therefore needed at that point. Moreover, the adjusting ball can be economically procured from outside, and both handling and assembly can be done with little effort or expense.

Thus in one exemplary embodiment, it is advantageous if the spring has a thickened region, in which the spring has an outside diameter which is slightly smaller than the inside diameter of a bore in which the adjusting ball is located. In such an embodiment, no friction, or only slight friction, occurs between the outside of the spring and the inside of the bore. As a result, the precision of the pressure regulating valve in the operating state is kept quite high.

If the outside diameter of the thickened region is from 0.99 to 0.85 times the inside diameter of the bore, preferably 0.95 times that diameter, then in this exemplary embodiment, the friction is reduced especially effectively.

To increase the precision of the pressure regulating valve in operation still further, it is advantageous if the thickened region rests essentially without friction on an inside of the bore. Displacement of the spring perpendicular to its length is then prevented especially effectively, including in the activated state of the pressure regulating valve, or in other words whenever the armature is attracted by the magnetic force in the direction of the magnet core.

If the spring has a thinned region with an outside diameter that is smaller than a different region of the spring, and this thinned region is present in the middle of the spring, then at least a certain region of the spring is designed such that it cannot come into contact with the magnet housing or the armature. Precise operation of the pressure regulating valve is thereby made possible.

To simplify assembly, it is advantageous in a further exemplary embodiment if the thinned region is surrounded by two thickened regions. In that case, the orientation with which the spring is built into the pressure regulating valve does not matter. Because the thickened region always comes into contact with the adjusting ball, the spring is moreover prevented especially effectively from slipping off the adjusting ball.

If the spring is located with its ends on the one hand in contact with the adjusting ball and on the other in contact with a portion diametrically opposite the adjusting balls, then it is possible for the spring to be located parallel to the displacement direction of the armature, and in particular coaxial to the sliding direction and coaxially to an axis of symmetry located in the longitudinal direction of the pressure regulating valve. The adjustability of the pressure regulating valve is improved still further as a result.

In a further embodiment, which is especially advantageous, the spring on each of its ends has nonresilient windings that are in contact with one another, preferably at least three windings each. Because at least two and preferably three windings are in contact with one another, these windings cannot yield; that is, in the region of the spring end windings in contact with one another, the spring cannot yield, which upon actuation of the pressure regulating valve, or in other words a change in the travel distance between the adjusting ball secured by calking in the magnet housing and the armature, causes no increase in the friction between the spring and the magnet housing, and particularly in a region in which the bore is present.

If the spring is a pressure-exerting helical spring, then in such an advantageous embodiment, recourse can be had to economical elements that are procured from outside. The use of helical springs leads to an especially sturdy embodiment of the pressure regulating valve, with a long service life.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
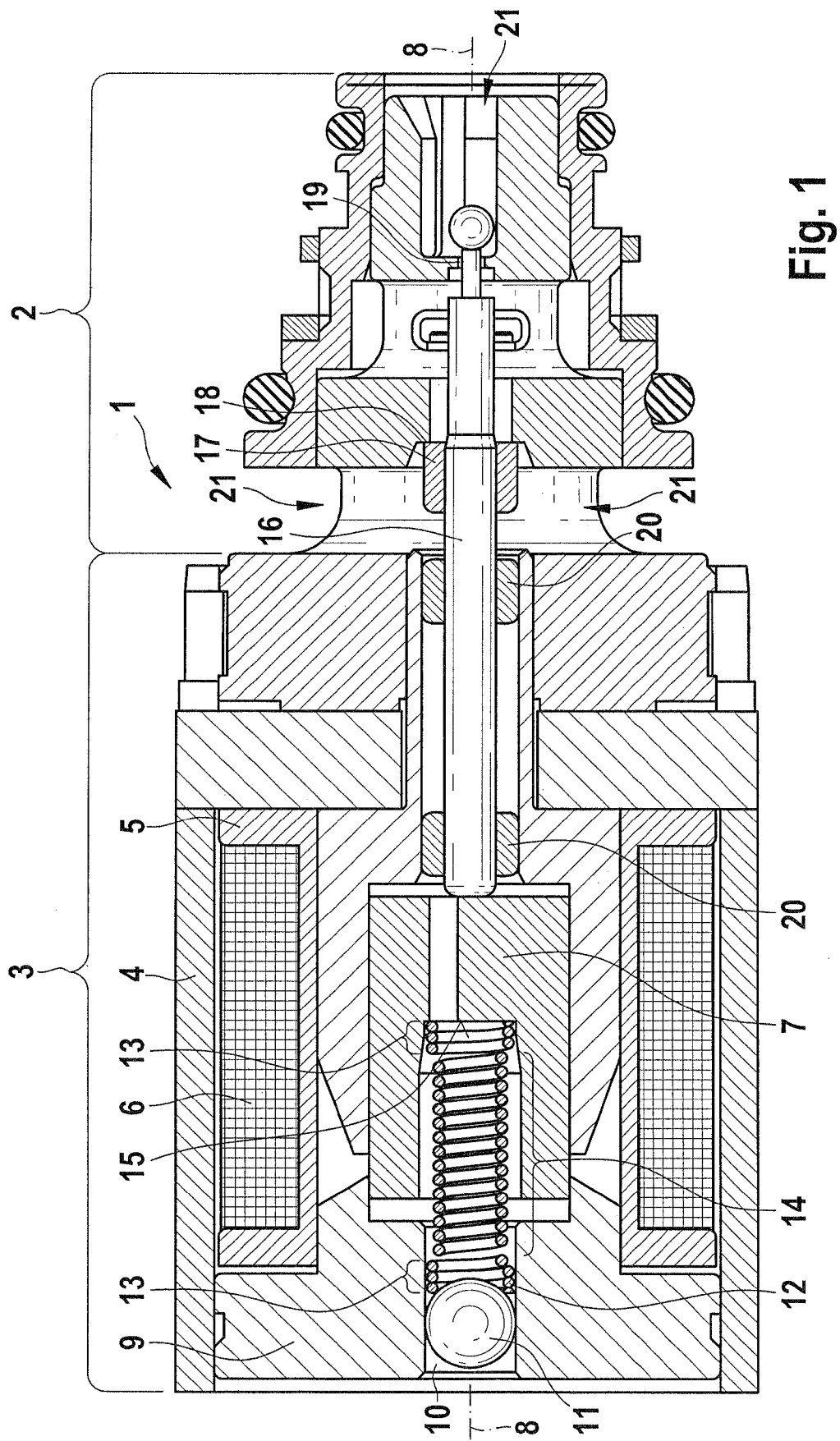
FIG. 1 shows a first embodiment of an electromagnetic pressure regulating valve according to the invention, in a schematic cross-sectional view.

FIG. 1 shows an electromagnetic pressure regulating valve 1, which is used in motor vehicles. The electromagnetic pressure regulating valve has a valve portion 2 and a magnet portion 3. The magnet portion 3 has a magnet housing 4. In the magnet housing 4, a magnet core 5 is located adjacent a magnet coil 6. The magnet coil 6 is supplied with current by means of lines not shown. The current supply is provided to suit the demand. When the magnet coil 6 is flooded with current, a magnetic force is generated in the magnet core 5 by the magnet coil 6. This magnetic force acts on an armature 7 located in the magnet housing 4. The armature 7 is located coaxially to a longitudinal axis 8 of the pressure regulating valve 1.

The electromagnetic pressure regulating valve 1, on a distal end of the magnet portion 3 diametrically opposite the valve portion 2, has a pole piece 9. There is a bore 10 in the pole piece 9. An adjusting ball 11 is located in the bore 10. The adjusting ball 11 is calked into the bore 10. A spring 12 is located between the adjusting ball 11 and the armature 7. The spring 12 is embodied as a helical spring. The helical spring is a compression spring.

The spring has spring end windings, contacting one another, on each of its ends. Each two or three windings are in contact with one another. It is also possible for four or five windings to be embodied in contact with one another. The region of the spring 12 that has the contacting spring end windings is also called the thickened region 13. Between the two thickened regions 13 embodied on the ends of the spring 12, there is a middle thinned region 14, which has resilient windings.

The spring 12 has a larger outside diameter in the thickened region 13 than in the thinned region 14. However, the outside diameter in the thickened region 13 of the spring 12 is smaller than the inside diameter of the bore 10. The spring 12 rests on one end with a terminal thickened region 13 on the adjusting ball 11 and on the other with the other terminal thickened region 13 on the armature 7.

This latter thickened region 13 is in contact, at least with a face 15 of the armature that is oriented transversely, preferably orthogonally to the longitudinally axis 8 of the pressure regulating valve 1. This face 15 is located inside a bore in the armature 7, and this bore tapers conically toward the face 15. It is possible for the conical embodiment of the bore to change again into a cylindrical embodiment near the region of the face 15. The face 15 has an outside diameter which is preferably precisely as large as the inside diameter of the bore 10.

The thinned region 14 of the spring 12 is not in contact with any movable part nor with any immovable part of the pressure regulating valve. Thus there is no friction between the thinned region 14 and the magnet housing 4.

In the exemplary embodiment shown, with its side diametrically opposite the adjusting ball 11, the armature 7 is in contact with a tappet 16. The tappet 16 has a bush 17 that has control edges 18.

The control edges 18 have an opening or closing effect with regard to the operating medium, which in the present exemplary embodiment is hydraulic oil. A displacement of the tappet 16 also has an opening or closing effect in the region of a valve opening 19, depending on the position of the armature 7.

In the exemplary embodiment shown, the tappet 16 is not solidly connected to the armature 7. However, it is guided in slide bearings 20.

The valve portion 2 furthermore has openings 21 for the operating medium.

The armature 7 is displaced in the direction of the longitudinal axis 8 upon the application of an electrical voltage to the magnet coil 6. The displacement of the armature 7 is effected in a manner known per se.

Figure 2:
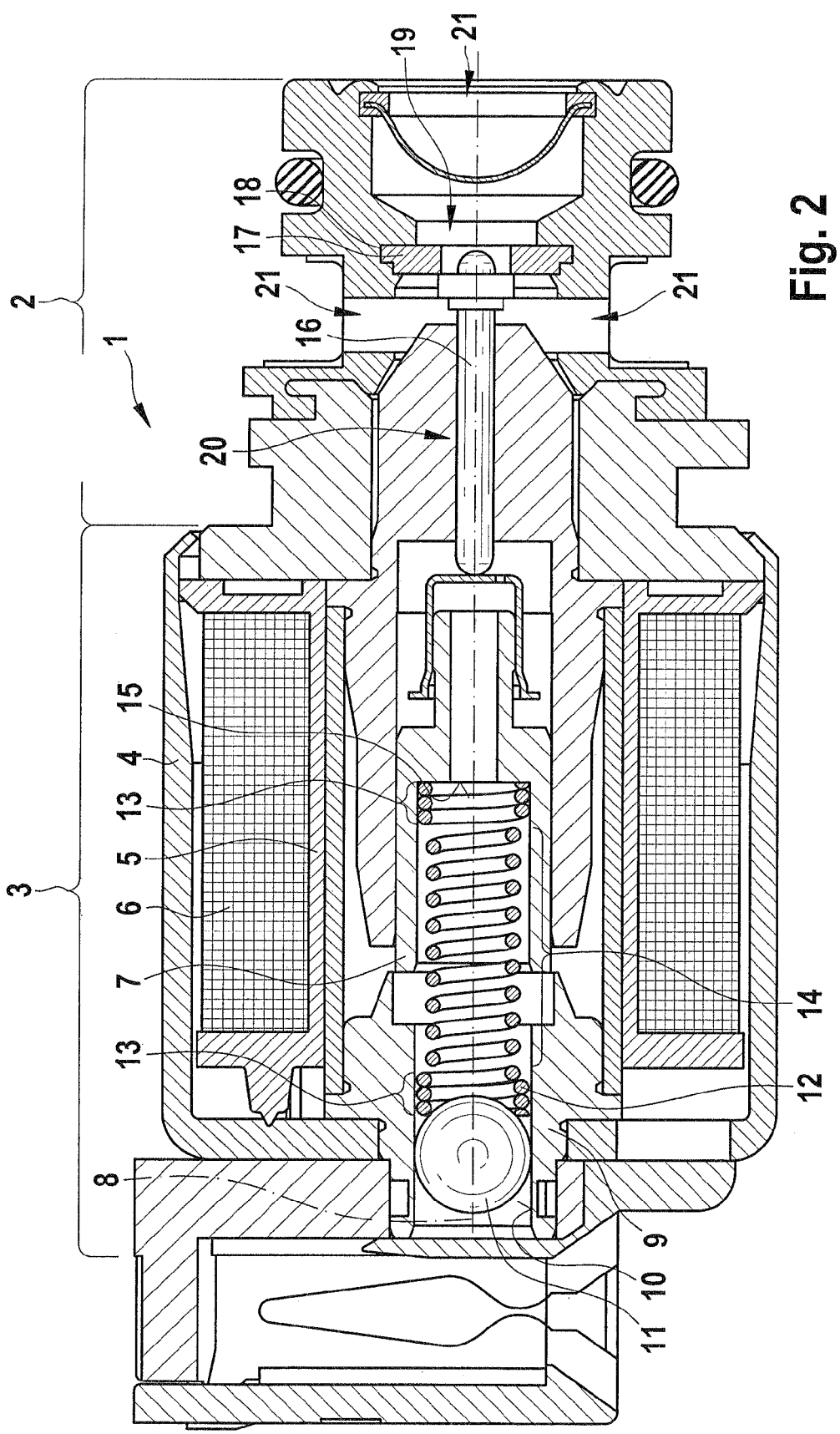
FIG. 2 shows a second embodiment of the present invention, in a schematic cross-sectional view.

FIG. 2 shows a second embodiment of the present invention, using the same reference numerals as in FIG. 1 for the same elements. On the distal end of the pressure regulating valve 1, which is remote from the openings 21, FIG. 2 has a pilot control regulating device.

In the pressure regulating valve of the invention, the adjusting spring has a plurality of contacting windings on the end, which have a larger diameter than the resilient windings. The bore in which the adjusting ball is located is simultaneously used as a spring centering means, without friction between the resilient windings and a ball receiving bore. The outside diameter of the contacting windings is slightly smaller than the ball receiving bore. This assures that the contacting end windings of the spring are guided with only slight play. Since a plurality of contacting end windings are received in this diameter, it is also assured that buckling of the spring cannot occur.

It will be understood that each of the elements described above, or two or more together, may also find a useful application in other types of constructions differing from the types described above.

While the invention has been illustrated and described as embodied in an electromagnetic pressure valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic pressure regulating valve, comprising:
   a valve portion for conducting and regulating a pressure of a working medium, such as oil;
   a magnet portion for actuating the valve portion for regulating the pressure of the working medium and having a magnet housing with a pole piece, said pole piece being provided with a bore;
   an adjusting ball provided in bore of the pole piece, wherein said adjusting ball is press-fit in said bore such that the adjusting ball seals an inner region of the pressure regulating valve;
   an armature, upon which magnetic force can be exerted as needed, located in the magnet housing; and
   a spring with a spring force generating a pressure activation threshold to be overcome in a regulation and located between the armature and the adjusting ball, wherein the spring is positioned to contact the adjusting ball with one end and the armature with another end, wherein the spring has regions of different diameter, wherein the spring has a thickened region, in which the spring has an outside diameter which is slightly smaller than an inside diameter of the bore in which the adjusting ball is located, wherein the spring has a thinned region with an outside diameter that is smaller than a different region of the spring, and the thinned region is provided in a middle of the spring, wherein the thickened region rests substantially without friction on an inside of the bore.

2. The electromagnetic pressure regulating valve as defined by claim 1, wherein the outside diameter of the thickened region is from 0.99 to 0.85 times the inside diameter of the bore.

3. The electromagnetic pressure regulating valve as defined by claim 1, wherein the outside diameter of the thickened region is 0.95 times the inside diameter of the bore.

4. The electromagnetic pressure regulating valve as defined by claim 1, wherein the thinned region is surrounded by two thickened regions.

5. The electromagnetic pressure regulating valve as defined by claims 1, wherein the spring on each of its ends has nonresilient windings that are in contact with one another.

6. The electromagnetic pressure regulating valve as defined by claim 5, wherein the spring on each of its ends has at least three nonresilient windings that are in contact with one another.

7. The electromagnetic pressure regulating valve as defined by claim 1, wherein the spring is a pressure-exerting helical spring.

* * * * *